(12) United States Patent
You

(10) Patent No.: US 11,005,136 B2
(45) Date of Patent: May 11, 2021

(54) BATTERY MODULE

(71) Applicant: CONTEMPORARY AMPEREX TECHNOLOGY CO., LIMITED, Ningde (CN)

(72) Inventor: Shubing You, Ningde (CN)

(73) Assignee: CONTEMPORARY AMPEREX TECHNOLOGY CO., LIMITED, Ningde (CN)

(*) Notice: Subject to any disclaimer, the term of this patent is extended or adjusted under 35 U.S.C. 154(b) by 71 days.

(21) Appl. No.: 16/430,036

(22) Filed: Jun. 3, 2019

(65) Prior Publication Data

US 2019/0379013 A1 Dec. 12, 2019

(30) Foreign Application Priority Data

Jun. 8, 2018 (CN) .......................... 201820885228.7

(51) Int. Cl.
*H01M 2/10* (2006.01)
*H01M 50/20* (2021.01)

(52) U.S. Cl.
CPC .................................. *H01M 50/20* (2021.01)

(58) Field of Classification Search
CPC .... H01M 2/10; H01M 2/1016; H01M 2/1077; Y02E 60/10
See application file for complete search history.

(56) References Cited

U.S. PATENT DOCUMENTS

2020/0106066 A1* 4/2020 Fukuoka ............. H01M 2/1264

* cited by examiner

*Primary Examiner* — Victoria H Lynch
(74) *Attorney, Agent, or Firm* — Morgan, Lewis & Bockius LLP

(57) ABSTRACT

The present disclosure provides a battery module, which comprises a plurality of battery arrays, a first end plate, a second end plate and a separating plate. Each battery array comprises a plurality of batteries sequentially arranged in a longitudinal direction, the plurality of battery arrays are sequentially arranged in a transversal direction. The first end plate and the second end plate are respectively positioned at two ends of the plurality of battery arrays in the longitudinal direction. The first end plate has a passage. The separating plate is provided between two adjacent battery arrays, one end of the separating plate in the longitudinal direction is fixed with the second end plate, the other end of the separating plate in the longitudinal direction extends into the passage and is fixed with the first end plate. In the passage, the separating plate has a bending portion not parallel to the longitudinal direction.

10 Claims, 6 Drawing Sheets

BATTERY MODULE

CROSS-REFERENCE TO RELATED APPLICATIONS

The present application claims priority to Chinese patent application No. CN201820885228.7, filed on Jun. 8, 2018, which is incorporated herein by reference in its entirety.

FIELD OF THE PRESENT DISCLOSURE

The present disclosure relates to the field of battery, and particularly relates to a battery module.

BACKGROUND OF THE PRESENT DISCLOSURE

A battery module generally comprises a plurality of batteries, the plurality of batteries are clamped by end plates respectively positioned at two ends of the batteries. When the plurality of batteries are arranged in multiple rows, and the batteries in each row are arranged in an array, it needs to provide a separating plate between two adjacent rows of batteries, and the separating plate needs to be welded with the end plates. The conventional method is to provide an end plate hole penetrating the end plate, then insert an end portion of the separating plate into the end plate hole, and weld along a boundary between the separating plate and the end plate by laser. In order to ensure assembling performance, a fitting gap is left between the separating plate and the end plate in the end plate hole; if the fitting gap is too large, the laser may be emitted into the inside of the battery module via the fitting gap, thereby burning the batteries. If the fitting gap is decreased, it may lead to difficulty of assembling, reduce the production efficiency and increase cost of production.

SUMMARY OF THE PRESENT DISCLOSURE

In view of the problem existing in the background, an object of the present disclosure is to provide a battery module, which can improve welding process, prevent the batteries being burned and promoting safety of the battery module.

In order to achieve the above object, the present disclosure provides a battery module, which comprises a plurality of battery arrays, a first end plate, a second end plate and a separating plate. Each battery array comprises a plurality of batteries sequentially arranged in a longitudinal direction, and the plurality of battery arrays are sequentially arranged in a transversal direction. The first end plate and the second end plate are respectively positioned at two ends of the plurality of battery arrays in the longitudinal direction.

The first end plate has a passage. The separating plate is provided between two adjacent battery arrays, one end of the separating plate in the longitudinal direction is fixed with the second end plate, the other end of the separating plate in the longitudinal direction extends into the passage and is fixed with the first end plate. In the passage, the separating plate has a bending portion not parallel to the longitudinal direction.

At least one end of the passage of the first end plate in an up-down direction is opened. Further, the first end plate comprises a first end sub-plate and a second end sub-plate, the passage is positioned between the first end sub-plate and the second end sub-plate, the separating plate is fixed with the first end sub-plate and the second end sub-plate.

The bending portion is arc in shape, preferably circular arc in shape and has a first bending region exposed to the outside of the first end plate. Further, the bending portion comprises a second bending region and a third bending region, the second bending region extends from one end of the first bending region, the third bending region extends from the other end of the first bending region. A portion of the first end plate is positioned between the second bending region and the third bending region in the transversal direction. At least one of a central angle of the second bending region and a central angle of the third bending region is larger than 90 degrees.

The bending portion is flat plate shaped or saw-toothed.

The separating plate further has a supporting portion extending to below the battery array.

The battery module further comprises two side plates, the two side plates are respectively positioned at two sides of the plurality of battery arrays in the transversal direction. The first end plate, the second end plate and the two side plates are fixedly connected and form a frame structure, the frame structure fixes the plurality of battery arrays.

The present disclosure has the following beneficial effects: a portion of the separating plate is exposed via the passage, so the exposed portion of the separating plate and the first end plate can be welded along a boundary between the exposed portion of the separating plate and the first end plate by laser, thereby connecting the separating plate and the first end plate together. Because the bending portion is not parallel to the longitudinal direction, the fitting gap between the separating plate and the first end plate will inevitably have an inclined portion relative to the longitudinal direction; even if the laser enters into the fitting gap between the separating plate and the first end plate, the laser will be blocked inevitably by the bending portion or the first end plate when the laser enters into the inclined portion of the fitting gap, thereby avoiding the laser being emitted to the inside of the battery module, preventing the batteries being burned, improving welding process and promoting safety of the battery module.

REFERENCE NUMERALS IN FIGURES ARE REPRESENTED AS FOLLOWS

1 battery array
  11 battery
2 first end plate
  21 first end sub-plate
  22 second end sub-plate 3 second end plate
4 separating plate
   41 bending portion
      411 first bending region
      412 second bending region
      413 third bending region
   42 supporting portion
   43 flat portion
5 side plate
P passage
X longitudinal direction
Y transversal direction
Z up-down direction

DETAILED DESCRIPTION

Hereinafter a battery module according to the present disclosure will be described in detail in combination with the figures.

Figure 1:
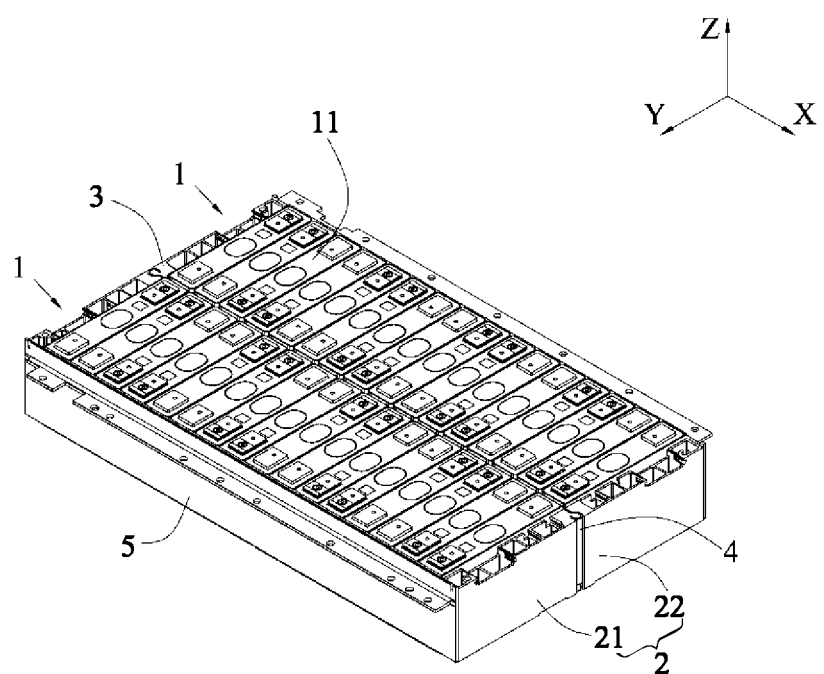
FIG. 1 is a schematic view of a battery module according to the present disclosure.

Referring to FIG. 1, a battery module of the present disclosure comprises a plurality of battery arrays 1, a first end plate 2, a second end plate 3 and a separating plate 4.

Each battery array 1 comprises a plurality of batteries 11 sequentially arranged in a longitudinal direction X, and the plurality of battery arrays 1 are sequentially arranged in a transversal direction Y. The battery 11 can be in the shape of hexahedron, main surfaces of adjacent batteries 11 face each other. Electrode terminals of the adjacent batteries 11 can be connected by a busbar.

The first end plate 2 and the second end plate 3 are respectively positioned at the two ends of the plurality of battery arrays 1 in the longitudinal direction X, and clamp the battery arrays 1 from the two ends.

The battery module may further comprise two side plates 5, the two side plates 5 are respectively positioned at two sides of the plurality of battery arrays 1 in the transversal direction Y, the first end plate 2, the second end plate 3 and the two side plates 5 are fixedly connected and form a frame structure, the frame structure fixes the plurality of battery arrays 1. Certainly, the side plate 5 also may be replaced by a strap; specifically, the strap encircles the first end plate 2, the second end plate 3 and the battery arrays 1 from outside, thereby fixing the first end plate 2, the second end plate 3 and the battery array 1 together.

Figure 4:
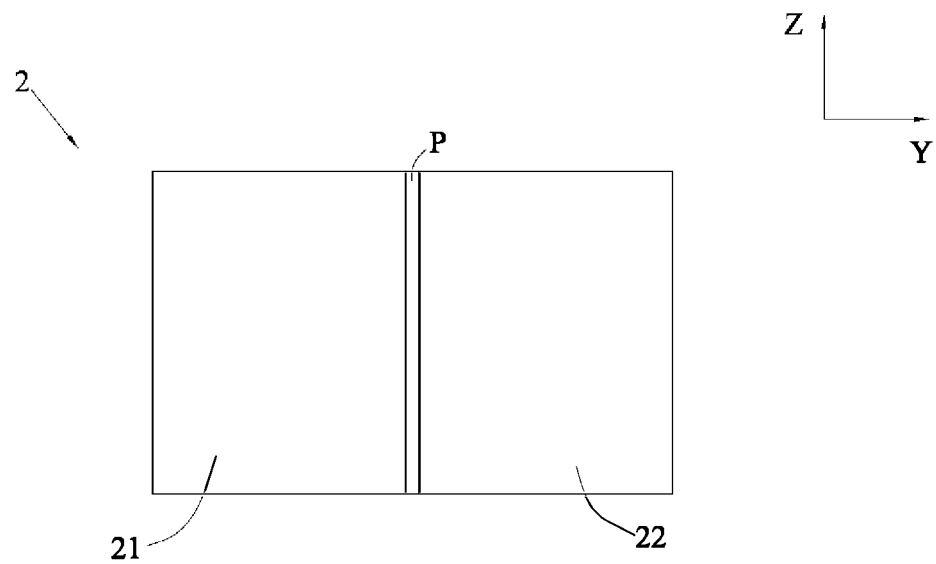
FIG. 4 is a schematic view of an embodiment of a first end plate of the battery module according to the present disclosure.
Figure 5:
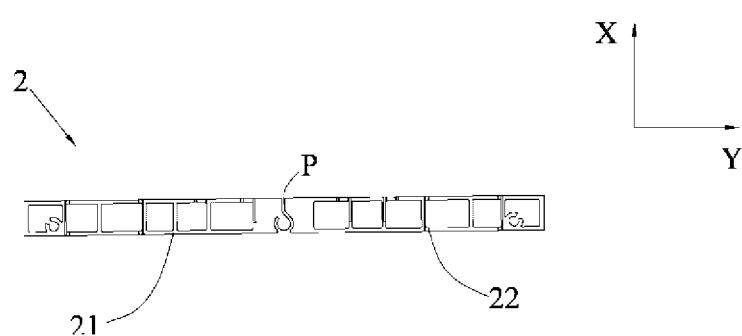
FIG. 5 is a top view of FIG. 4.

Referring to FIG. 4 and FIG. 5, the first end plate 2 has a passage P; an inner opening of the passage P is provided on an inner surface of the first end plate 2 close to the battery arrays 1, and an outer opening of the passage P is provided on an outer surface of the first end plate 2 away from the battery arrays 1.

Figure 2:
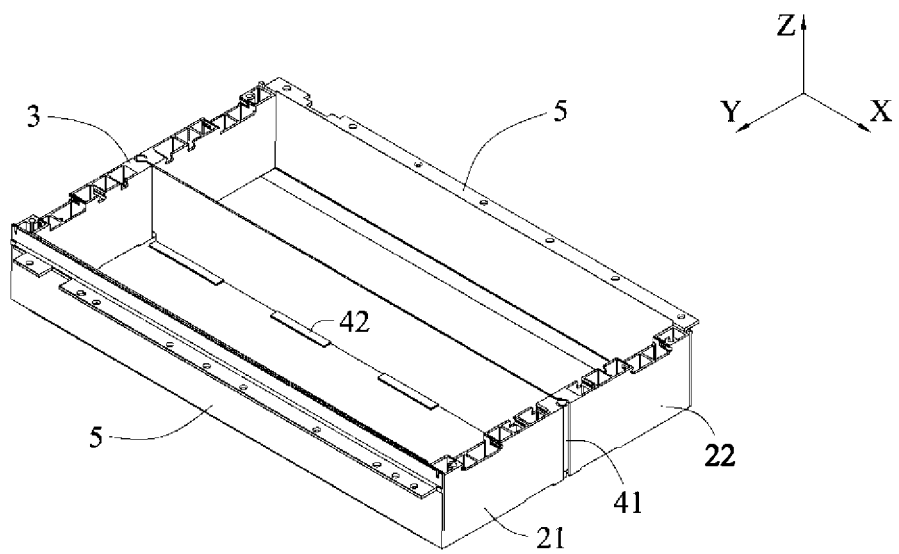
FIG. 2 is another schematic view of the battery module according to the present disclosure with battery arrays omitted.
Figure 3:
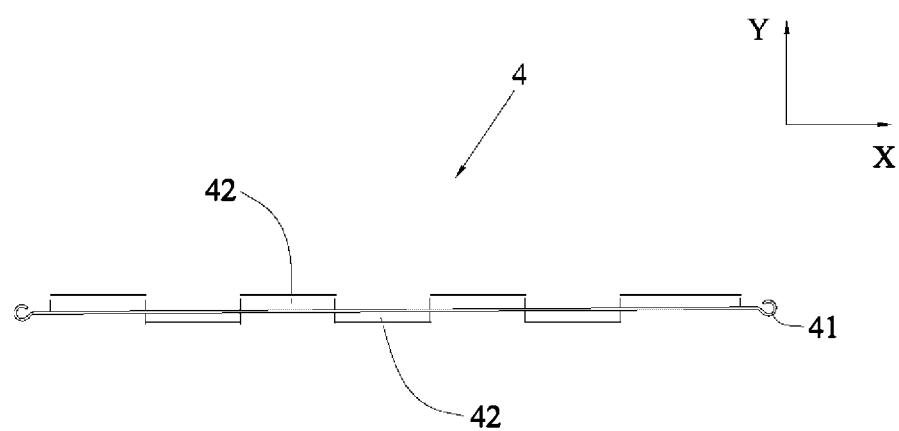
FIG. 3 is a top view of a separating plate of the battery module according to the present disclosure.
Figure 7:
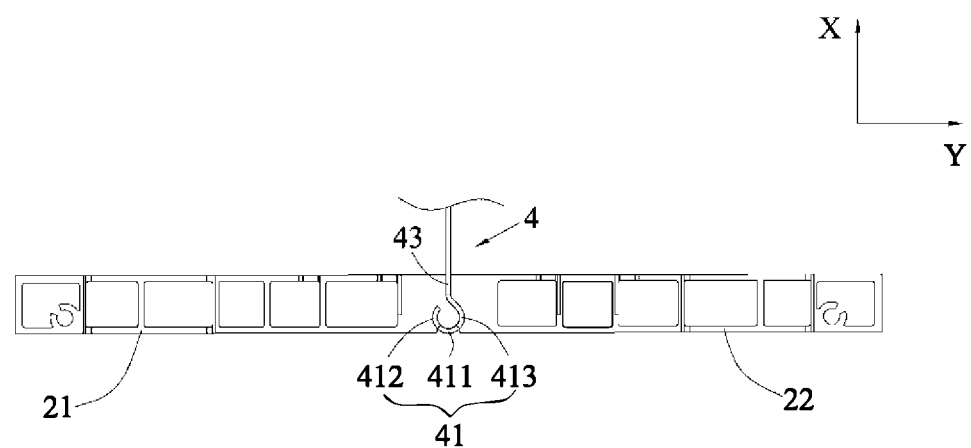
FIGS. 7-11 respectively are assembled views of the first end plate and the separating plate in different embodiments.

Referring to FIG. 1, FIG. 2 and FIG. 7, the separating plate 4 is provided between two adjacent battery arrays 1, one end of the separating plate 4 in the longitudinal direction X is fixed with the second end plate 3, the other end of the separating plate 4 in the longitudinal direction X extends into the passage P and is fixed with the first end plate 2. In the passage P, the separating plate 4 has a bending portion 41 not parallel to the longitudinal direction X. Certainly, in the passage P, the separating plate 4 also can has a flat portion 43 parallel to the longitudinal direction X.

The separating plate 4 may be formed by bending a plate, preferably by bending a plate with a uniform thickness. Because the separating plate 4 has a small thickness, the later description of the shape of the bending portion 41 ignores the thickness of the bending portion 41.

A part of the separating plate 4 extending into the passage P corresponds to the passage P in shape, a surface of the separating plate 4 may be closely attached on a circumferential wall of the passage P. Certainly, in order to assemble conveniently, a fitting gap may be left between the surface of the separating plate 4 and the circumferential wall of the passage P.

Referring to FIG. 2, a portion of the separating plate 4 is exposed via the outer opening of the passage P, so the exposed portion of the separating plate 4 and the first end plate 2 can be welded along a boundary between the exposed portion of the separating plate 4 and the first end plate 2 by laser, thereby connecting the separating plate 4 and the first end plate 2 together. Because the bending portion 41 is not parallel to the longitudinal direction X, the fitting gap between the separating plate 4 and the first end plate 2 will inevitably have an inclined portion relative to the longitudinal direction X; even if the laser enters into the fitting gap between the separating plate 4 and the first end plate 2, the laser will be blocked inevitably by the bending portion 41 or the first end plate 2 when the laser enters into the inclined portion of the fitting gap, thereby avoiding the laser being emitted to the inside of the battery module, preventing the batteries 11 being burned, improving welding process and promoting safety of the battery module.

Preferably, the second end plate 3 may also have a passage P, the one end of the separating plate 4 in the longitudinal direction X extends into the passage P of the second end plate 3, is exposed to the outside of the second end plate 3 and fixed with the second end plate 3. In the passage P of the second end plate 3, the separating plate 4 may also have a portion not parallel to the longitudinal direction X.

At least one end of the passage P of the first end plate 2 in an up-down direction Z is opened. When assembling, the separating plate 4 can be inserted into the passage P of the first end plate 2 via the opened end of the passage P.

Figure 6:
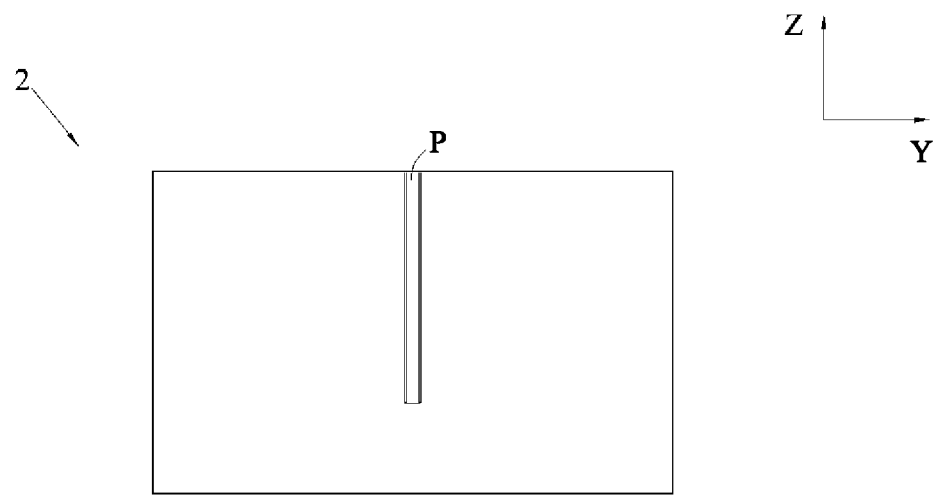
FIG. 6 is a schematic view of another embodiment of the first end plate of the battery module according to the present disclosure.

Referring to FIG. 4 and FIG. 5, the first end plate 2 may comprise a first end sub-plate 21 and a second end sub-plate 22, the passage P is positioned between the first end sub-plate 21 and the second end sub-plate 22, in other words, a gap between the first end sub-plate 21 and the second end sub-plate 22 can be used as the passage P through which the separating plate 4 passes; the separating plate 4 is fixed with the first end sub-plate 21 and the second end sub-plate 22. Alternatively, referring to FIG. 6, the first end plate 2 may be an integral flat plate, the passage P is a groove recessed downwardly from an upper end of the first end plate 2 and having a predetermined depth.

Referring to FIG. 2, the separating plate 4 further has a supporting portion 42 extending to below the battery array 1. The supporting portion 42 can not only support the batteries 11, but also strengthen the whole mechanical strength of the separating plate 4. The supporting portion 42 may be formed by cutting process and bending process. The supporting portion 42 can be provided as plurality, a part of the supporting portions 42 extends to one side in the transversal direction Y, the remaining part of the supporting portions 42 extends to the other side in the transversal direction Y.

Hereinafter the battery module according to the present disclosure will be described in combination with a plurality of embodiments.

In an embodiment, referring to FIG. 7, the bending portion 41 is arc in shape, preferably circular arc. The bending portion 41 has a first bending region 411 exposed to the outside of the first end plate 2.

The first end plate 2 may comprise a first end sub-plate 21 and a second end sub-plate 22, the passage P is positioned between the first end sub-plate 21 and the second end sub-plate 22. The first bending region 411 and the first end sub-plate 21 can be welded along a boundary between the first bending region 411 and the first end sub-plate 21, thereby connecting the first end sub-plate 21 and the separating plate 4 together; the first bending region 411 and the second end sub-plate 22 can be welded along a boundary between the first bending region 411 and the second end sub-plate 22, thereby connecting the second end sub-plate 22 and the separating plate 4 together Preferably, the bending portion 41 further comprises a second bending region 412 and a third bending region 413. The second bending region 412 extends from one end of the first bending region 411 and extends into the first end sub-plate 21, correspondingly, the passage P also has a portion extending into the first end sub-plate 21. The third bending region 413 extends from the other end of the first bending region 411. A portion of the first end sub-plate 21 is positioned between the second bending region 412 and the third bending region 413 in the transversal direction Y. The third bending region 413 may be connected with the flat portion 43 of the separating plate 4.

In the longitudinal direction X, the first end sub-plate 21 is limited by the first bending region 411 and the batteries 11; in the transversal direction Y, the first end sub-plate 21 is limited by the second bending region 412 and the third bending region 413. Therefore the relative position of the first end sub-plate 21 and the separating plate 4 is fixed; at this time, it only needs to weld the first bending region 411 and the second end sub-plate 22 along the boundary between the first bending region 411 and the second end sub-plate 22, and there is no need to weld the first bending region 411 and the first end sub-plate 21, thereby simplifying welding process and promoting efficiency.

Further, at least one of a central angle of the second bending region 412 and a central angle of the third bending region 413 is larger than 90 degrees. Preferably, both the central angle of the second bending region 412 and the central angle of the third bending region 413 are larger than 90 degrees. This can enlarge the contacting area between the bending portion 41 and the first end sub-plate 21, avoid the bending portion 41 being deformed when the bending portion 41 is subjected to a force, and promote stability.

Figure 8:
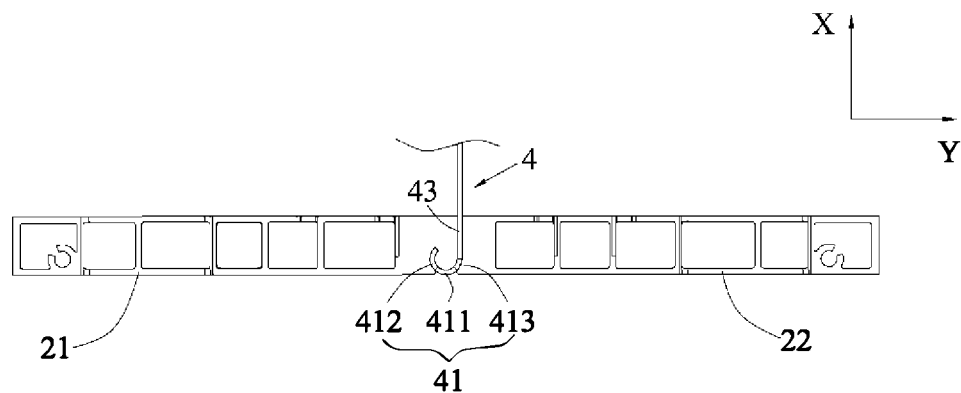

In another embodiment, referring to FIG. 8, the bending portion 41 is circular arc in shape. The bending portion 41 has a first bending region 411, a second bending region 412 and a third bending region 413. The first bending region 411 is exposed to the outside of the first end plate 2, the second bending region 412 extends from one end of the first bending region 411 and extends into the first end sub-plate 21, the third bending region 413 extends from the other end of the first bending region 411 and is connected with the flat portion 43 of the separating plate 4. At this time, a central angle of the third bending region 413 is small, a central angle of the second bending region 412 is larger than 90 degrees, in the transversal direction Y, the first end sub-plate 21 is mainly limited by the second bending region 412 and the flat portion 43.

Figure 9:
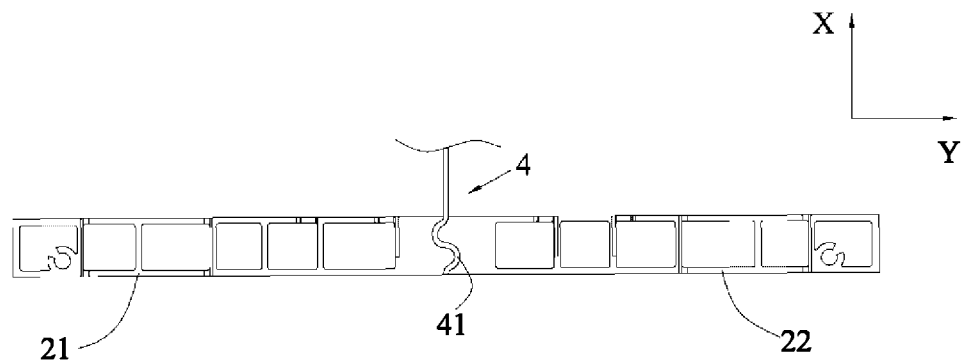
Figure 10:
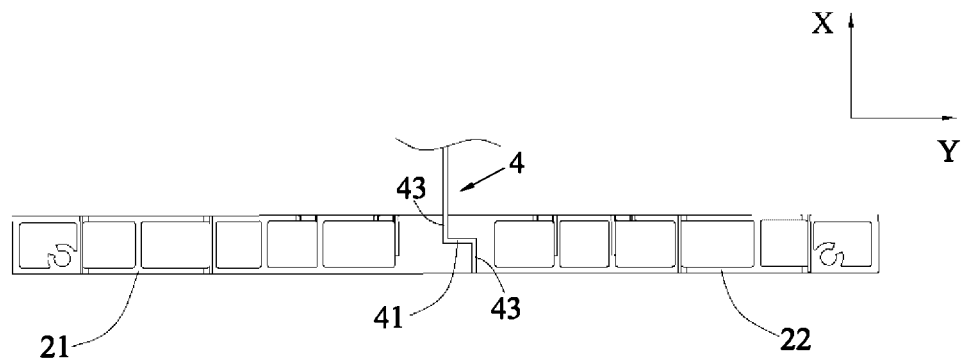
Figure 11:
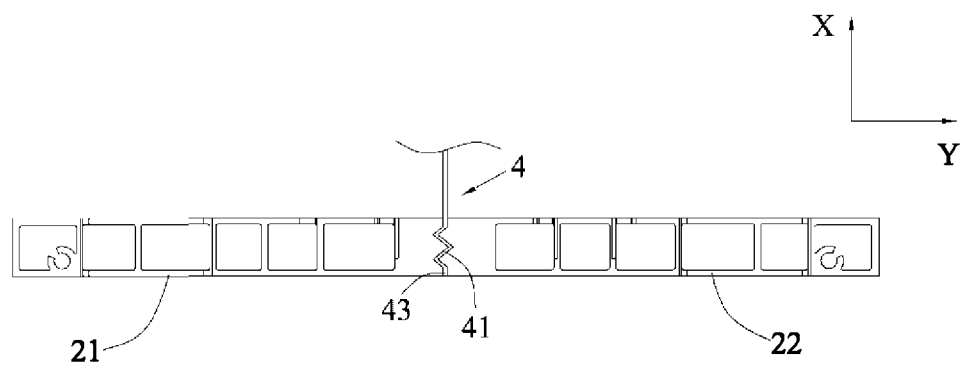

In still another embodiment, referring to FIG. 9, the bending portion 41 is arc in shape, such as S-shaped or wave shaped. Alternatively, referring to FIG. 10, the bending portion 41 is flat plate shaped, preferably, the bending portion 41 is perpendicular to the longitudinal direction X. Referring to FIG. 11, the bending portion 41 may also be saw-toothed.

What is claimed is:

1. A battery module, comprising a plurality of battery arrays, a first end plate, a second end plate and a separating plate;
   each battery array comprising a plurality of batteries sequentially arranged in a longitudinal direction, and the plurality of battery arrays being sequentially arranged in a transversal direction;
   the first end plate and the second end plate being respectively positioned at two ends of the plurality of battery arrays in the longitudinal direction;
   wherein
   the first end plate has a passage;
   the separating plate is provided between two adjacent battery arrays, one end of the separating plate in the longitudinal direction is fixed with the second end plate, the other end of the separating plate in the longitudinal direction extends into the passage and is fixed with the first end plate;
   in the passage, the separating plate has a bending portion not parallel to the longitudinal direction.

2. The battery module according to claim 1, wherein at least one end of the passage of the first end plate in an up-down direction is opened.

3. The battery module according to claim 2, wherein
   the first end plate comprises a first end sub-plate and a second end sub-plate, the passage is positioned between the first end sub-plate and the second end sub-plate, the separating plate is fixed with the first end sub-plate and the second end sub-plate.

4. The battery module according to claim 1, wherein the bending portion is arc in shape.

5. The battery module according to claim 4, wherein the bending portion is circular arc in shape and has a first bending region exposed to the outside of the first end plate.

6. The battery module according to claim 5, wherein
   the bending portion further comprises a second bending region and a third bending region, the second bending region extends from one end of the first bending region, the third bending region extends from the other end of the first bending region;
   a portion of the first end plate is positioned between the second bending region and the third bending region in the transversal direction.

7. The battery module according to claim 6, wherein at least one of a central angle of the second bending region and a central angle of the third bending region is larger than 90 degrees.

8. The battery module according to claim 1, wherein the bending portion is flat plate shaped or saw-toothed.

9. The battery module according to claim 1, wherein the separating plate further has a supporting portion extending to below the battery array.

10. The battery module according to claim 1, wherein
    the battery module further comprises two side plates, the two side plates are respectively positioned at two sides of the plurality of battery arrays in the transversal direction;
    the first end plate, the second end plate and the two side plates are fixedly connected and form a frame structure, the frame structure fixes the plurality of battery arrays.

* * * * *